Oct. 4, 1932.  P. SMITH ET AL  1,881,034
SAFETY DEVICE FOR AEROPLANES
Original Filed April 2, 1930  4 Sheets-Sheet 1
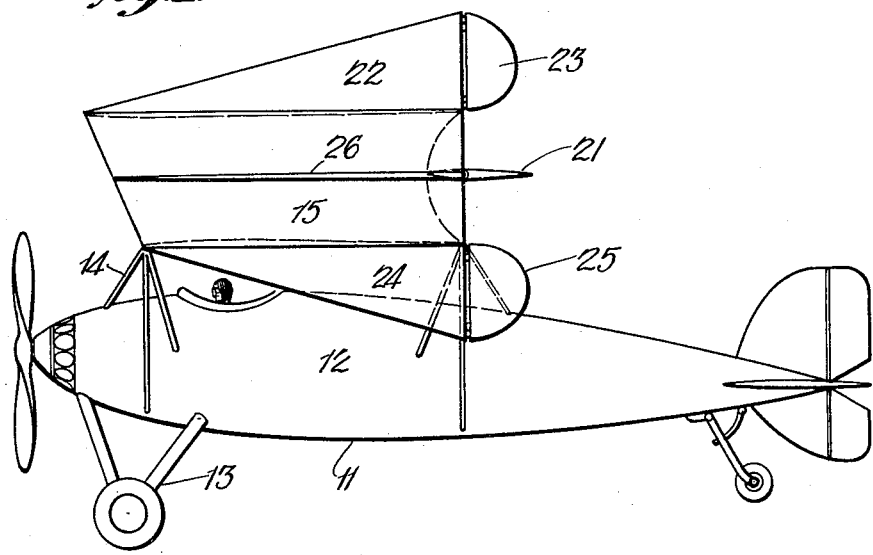
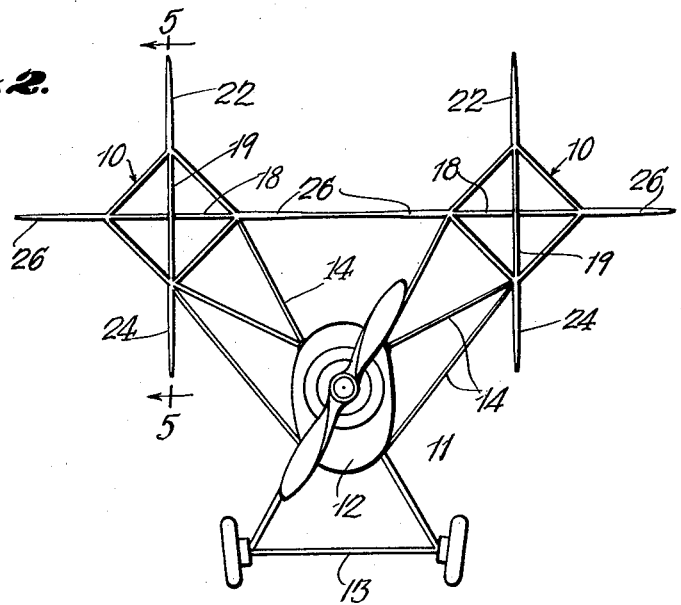
Inventor
PAUL SMITH.
FRED H. MANN.
By *Clarence A O'Brien*
Attorney.

Oct. 4, 1932.  P. SMITH ET AL  1,881,034
SAFETY DEVICE FOR AEROPLANES
Original Filed April 2, 1930   4 Sheets-Sheet 2

Inventor
PAUL SMITH.
FRED H. MANN.
By Clarence A. O'Brien
Attorney

Oct. 4, 1932.  P. SMITH ET AL  1,881,034
SAFETY DEVICE FOR AEROPLANES
Original Filed April 2, 1930  4 Sheets-Sheet 3

Inventors
PAUL SMITH.
FRED H. MANN.
By Clarence A. O'Brien
Attorney

Inventors
PAUL SMITH
FRED H. MANN.
By Clarence A O'Brien
Attorney

Patented Oct. 4, 1932

1,881,034

UNITED STATES PATENT OFFICE

PAUL SMITH AND FRED H. MANN, OF BROOKLYN, NEW YORK

SAFETY DEVICE FOR AEROPLANES

Application filed April 2, 1930, Serial No. 441,020. Renewed June 10, 1932.

This invention relates to improvements in aeroplanes.

The primary object of the invention resides in a safety attachment for aircrafts increasing their forces, balance and stability whereby the safety of aeroplanes is greatly improved both while taking off, in flight and landing. The principle involved in the invention will be found in the dynamic action of the air gained by carefully observing and imitating wind positions of birds in flight, and which imparts to an aeroplane a birdlike safety.

Another object of the invention is to provide a safety appliance for aeroplanes in which the coefficient forces and the speed is materially increased due to an additional combination area and reduction of the wing area, which reduction effects a similar reduction in parasite resistance, which is due to a neutral and pressure flow and control of the flow and down wash developed immediately with the device upon the movement of a plane.

A further object of the invention will permit the construction of larger and stronger aeroplanes with larger and more power units.

Other objects of the invention are to simplify the operation and the construction of aircraft while increasing the weight, power, and speed; to produce higher forces, better balance and stability conditions and cause a reduction of resistance, and prevent accidents.

With these and other objects in view, the invention resides in the certain novel construction, combination and arrangement of parts, within units of aerodynamics the essential features of which are hereinafter fully described, are particularly pointed out in the appended claims, and are illustrated in the accompanying drawings, in which:

Figure 1 is a side elevational view of our invention applied to a wingless aeroplane.

Figure 2 is a front elevational view of the same.

Figure 3:
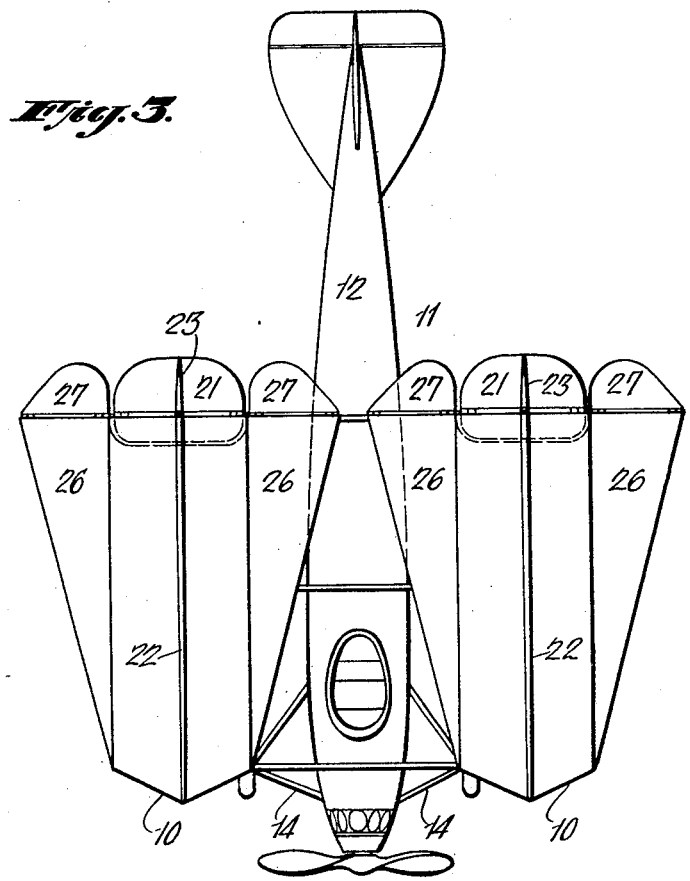
Figure 3 is a top plan view.
Figure 4:
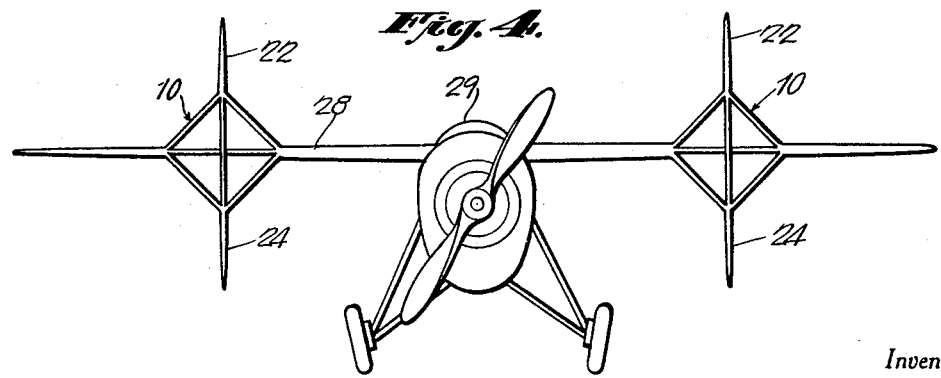
Figure 4 is a front elevational view of our invention embodied in the wing of a monoplane.
Figure 9:
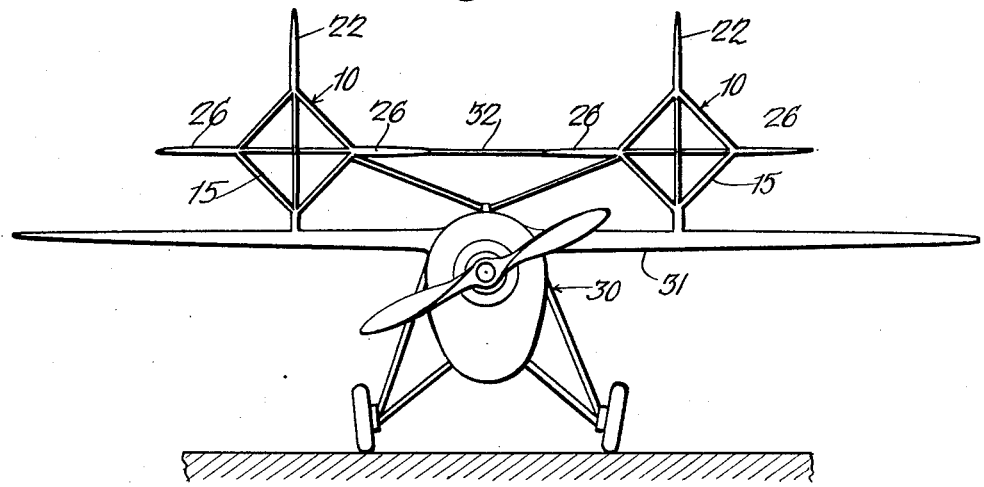
Figure 9 is a front elevational view of a monoplane showing our device associated therewith, but on a plane above an airfoil.
Figure 10:
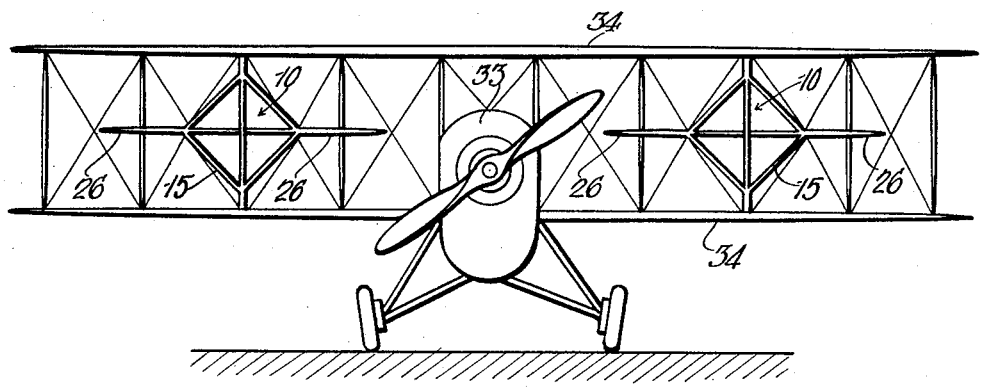
Figure 10 is a front elevational view of a biplane equipped with our device.

Referring to the drawings by reference characters, the numeral 10 designates our improved safety device in its entirety, two or more of which may be applied to a single aeroplane of any known type, and in Figures 1 to 3, inclusive, we have illustrated the principle as applied to what we term a wingless plane, while in Figure 4 the devices are shown associated with a monoplane, the same being embodied in the wing thereof. In Figure 9 the devices are shown associated with a plane of the monoplane type, but in this form they are disposed above the airfoil. In Figure 10 we show the device embodied in a biplane, but in all instances, the safety devices are respectively disposed on opposite sides of the longitudinal axis of the fuselage to impart higher forces a perfect balance and stability condition to the craft. The principle involved in all of the forms shown being the same, it is believed that a description of one of the devices 10 will suffice for the various uses, and therefore like reference characters refer to like parts throughout.

In the preferred embodiment of our invention shown in Figures 1 to 3 inclusive, the numeral 11 designates an aeroplane embodying the usual fuselage 12, landing gear 13, while supported by struts or frame work 14, are two of our safety devices 10, the same being supported on a level above the plane of the fuselage 12. In this form the two devices 10 are respectively disposed on opposite sides of the vertical longitudinal axis of the fuselage so as to impart higher forces, an equal balance and stability to the craft and the two devices coact to take the place of the usual airfoil.

Figure 5:
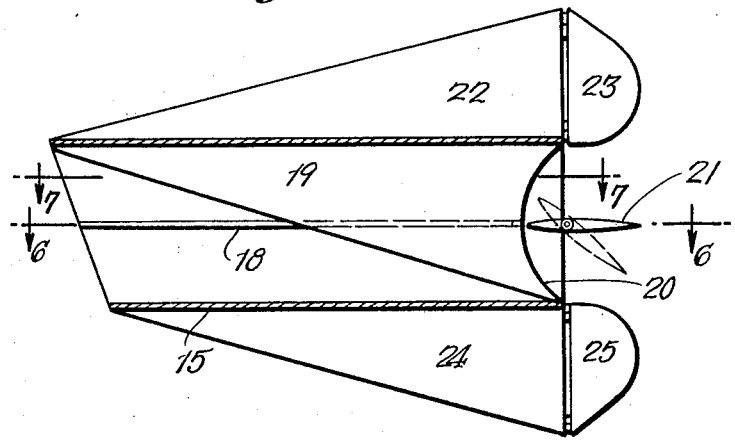
Figure 5 is a vertical sectional view on the line 5—5 of Figure 2.

Each of the devices 10 includes a restricted casing 15 of any desired shape in cross section, cambered and streamlined but in this instance, the cross sectional contour is square with the opposed corners of the casing in vertical and horizontal alinement. The top and bottom sections of the casing 15 are substantially parallel and stagger as shown in Figure 5 of the drawings, while the opposed side sections taper outwardly at the leading edge of the casing, as at 16, and best seen in Figure 7 of the drawings, while the said side sections are cambered outwardly toward the trailing edge so that the casing is provided with a restricted gap/chord ratio 17. The leading edge of the casing staggers at an angle so that the top sections and the lower sections have alike gap/chord ratio as shown in Figure 5.

Extending inwardly from opposite sides of the casing 15 are horizontally disposed stabilizer fins 18, which fins have their leading edges tapering from the front of the casing to a point adjacent the rear within the front bar of a wing. Depending downwardly from the top sections of the casing is a center vertical fin or stabilizer 19, the leading edge of which extends from the top section of the casing at the front thereof to a point at the rear bottom section of the same, as best seen in Figure 5. The horizontal stabilizer fins 18 engage the vertical stabilizer fin 19 adjacent the rear and when looking at the casing in end elevation as seen in Figure 2, the interior of the casing appears to be divided by the coacting fins 18 and 19 into four separate chambers or passages.

Figure 6:
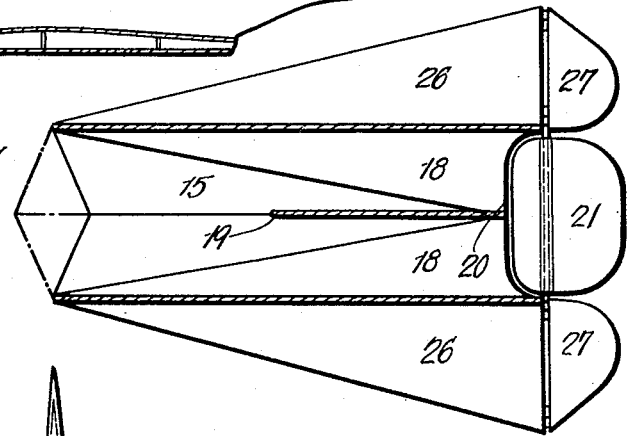
Figure 6 is a horizontal sectional view on the line 6—6 of Figure 5.

The rear end of the fins 18 and 19 are cut away as at 20 to accommodate for the movement of a horizontally disposed elevator rudder 21, which may be adjusted to convert the flow of the air within the casing, the said rudder extends the span of the casing as seen in Figure 6.

Rising from the top corner of the casing 15 is a top vertical fin 22, the leading edge of the fin being tapered forwardly from the rear end to the top section of the casing. Hinged to the rear of the fin 22 is a vertical aileron 23. Depending from the lower section or edge of the casing 15 is a bottom vertical fin 24, the leading edge of which is tapering from the rear toward the front. By tapering the edges of the fins 22 and 24, the resistance is materially decreased and like the fin 22, the fin 24 carries at its rear, a vertical aileron 25.

Extending outwardly from the opposite side edges of the casing 15 are horizontal fins 26—26, the leading edges of which are tapered similar to the fins 22 and 24, while carried by the rear end of the said fins 26 are horizontal ailerons 27—27. Although no actuating means has been shown connected to the elevator rudder 21, and various ailerons, it will be appreciated that such means may be provided if desired for the purpose of actuating the same to control the flow and downwash of the air.

Figure 7:
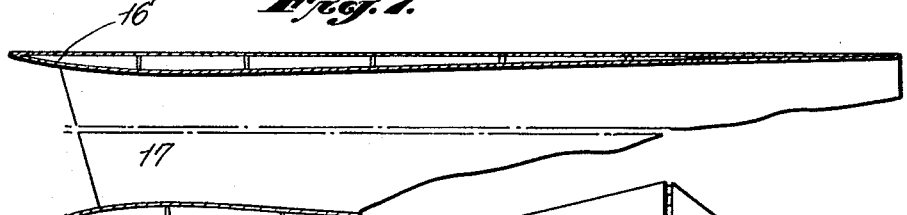
Figure 7 is a fragmentary horizontal sectional view on the line 7—7 of Figure 5.
Figure 8:
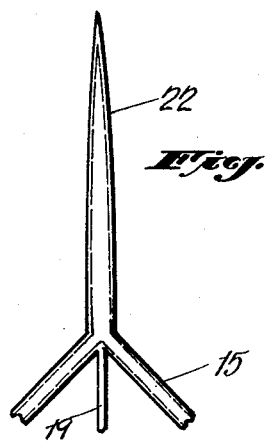
Figure 8 is an enlarged detail elevational view showing the manner in which one of the vertical fins is associated with the casing.

Although the sectional views 5 and 6 illustrate the parts somewhat diagrammatic, by reference to Figures 7 and 8 it will be noted that the casing and the fins may be constructed of light material and the parts be cambered and stream-lined to reduce resistance of a plane.

In practice, it will be seen that movement of an aircraft either upon the ground or when in the air, will cause forces to be exerted to the various surfaces of the casing 15 by reason of the dynamic action of the air, through which it moves. The speed of the plane will with its forward motion incline and dive develop pressure within the casing 15 and exhaust a certain amount of flow through the rear, but an internal pressure within the casing 15 is produced which is caused by the various adjustments of the casing and the elevator rudder 21. It will be appreciated that by gradually increasing the pressure, and the downwash, it will cause an increase in the forces of the plane. The outer sections of the casing 15 produce a wing like action in flight and coacts with the air pressure set up within and outside the casing to produce a safe and stable craft. The bottom sections of the casing act in the nature of a keel and therefore lend added balance and stability to the airfoil.

In Figure 4 of the drawings, we have illustrated our invention as applied to the wings 28 of a monoplane 29, the devices 10—10 being built into the wings to develop additional forces, balance and stability for the craft, permitting the use of a smaller aspect ratio for an aeroplane of a given performance.

In Figure 9 of the drawings, we have shown a monoplane 30 having the usual wings 31, while mounted upon the wings and disposed thereabove are a pair of the safety devices 10—10, the adjacent horizontal fins 26—26 being connected as at 32. The forces, balance and stability of a monoplane equipped with the devices 10—10 as shown in this figure imparts better efficiency to the craft.

In Figure 10 of the drawings, we have shown a biplane 33 having spaced wings 34 between which the safety devices 10—10 are mounted, the same being disposed on opposite sides of the fuselage of the craft. The function of the device 10 as hereinbefore mentioned is the same in all the uses herein shown and described.

The obtained results through wind tunnel tests are identical to those above stated, but an actual reduction to practice has been made to obtain the correct factors for flat plates, used conventionally in the development of airfoils. The attachment of the device has been considered for all types of aeroplanes, as stated, and therefore, it is our intention to construct certain area of the device accordingly, remaining within the units of aerodynamics and be limited by the same, and procure the effects of aspect ratio as per airfoil characteristics.

There will be no change of parts of the device whatsoever, but the limit of area within the device must automatically be reduced or extended, which is complexly required for the general use of the device, obeying the law of aerodynamics, including the types of planes, as claimed in the application and procure such effects in accordance of variations of airfoil dimensions.

The construction of the control-area has been reduced in reference of aerodynamic units, relative to data pertaining to a control-unit of a slow or fast, light or heavy plane, demonstrating a complex distribution of forces exerting to procure the effectiveness of a control system, being transactive and of momentary or prolonged force as circumstances would require, and controllability for movements of the device in flight in accordance with the characteristics of an airfoil. The stabilizers and fins, a main area, is of expansible complex in its aspect-ratio, toward the leading edges of the casing, the dividing center line of the chord being the root section and being tapered toward the fin-tips. All sectional area must be developed referable to cambered and streamlined airfoil sections. The casing has a positive or negative stagger, equivalent in the leading and trailing edge to maintain the coefficiency of forces of the biplane. One or more slots, dividing the casing into sections has been found to be of an advantage. However, the data of a closed casing is more or less relative to the slotted one, the slot being the factor of a reduction of the drag effecting a higher L/D curve.

Whereas, the closed casing has a higher value of $K_y$; the relative aspect-ratio of the horizontal area increases or decreases the lift value, causing the complexity of forces in a relative way, thus giving a considerable advantage, practically to the extent of our theory and the specification of the device. The tips of the fin-area employ a positive, negative, elliptical or square shape, depending on the lift and the load factor of the wing-tips as per calculation of the type and its forces, in the selection of airfoils which are to be considered to use this safety device in addition of a main airfoil. The leading edge of the stabilizers and fins on the main area must be within the front spar of a wing, if an attachment within the same is made, whereas the device placed above, between or below the wings would perform with a limited horizontal area, in this case indicating the speedplane. However, including practical limits for aspect ratio, gap/chord ratio and stagger of all parts of the device.

On the contrary, if placing the leading edge of main area of the device within the front spar of an airfoil, it would indicate a high lift-plane, thereby demonstrating the expansible complex of the aspect-ratio, the gap/chord ratio and stagger in this respect to exclude a structural interference with the front spar of a wing. The elevator-rudder results in a continuation of the wing-sections of camber coordinates $x/C$, $a/C$ for the upper surface and $x/C$, $b/C$ for the lower surface, including the main area controlling and generating the downwash of air, this being the forcible reserve and moments, bringing about higher values of L/D, $K_y$, $K_x$, controllable to about 25-40 degree, in an angle of 20 degree elevator rudder, the L/D maximum of the device with flat sections is that of zero angle of attack, L/D=5.5 in this position. The $K_y$ is automatically raised, due to coordinates of points on the upper and lower surfaces, pertaining to cambered airfoil sections.

The elevator-rudder area, comprising a restorative activity in a union with the ailerons, the latter being used for a forcible drag only, should employ the area of the ailerons inclusive, for a control of the downwash, as the identical degree of both, causes same movements such as the increase or decrease of the forces to secure easier operating facilities and additional forces for a combined operation of the horizontal ailerons and the elevator-rudder for the increase or decrease of the downwash, producing effectual coefficiency of force, perpendicular to the direction of the wind and in directions opposite to that in which the movable parts are moved.

The exact limit of the aspect-ratio, including the casing, the fins, the stabilizer, and the control area, and as indicated before, the exact limit of the leading and the trailing edges of the said parts, demonstrating a relative data in a change of the aspect-radio, is a matter of the correction factor for aspect-ratio of a flat plate normal to the wind as per calculation of preliminary design including the monoplane and biplane, indicating aerodynamic coefficiency of the device for normal and increased angles of attack, only, if the safety device is constructed within the units of aerodynamics as indicated by a law of aerodynamics. All parts of the device, including the control surfaces, are cambered and streamlined in order that they will offer as little resistance as possible to passage through the air.

While we have shown and described what we deem to be the most desirable embodiment of our invention, it will be understood that various changes may be made in construction if desired, and we do not limit ourselves to the exact details of construction herein set forth, nor to anything less than the whole of our invention, limited only by the appended claims.

Having thus described the invention, what we claim as new and desire to secure by Letters Patent is:—

1. In air craft having a fuselage, a pair of safety appliances respectively disposed parallel to and on opposite sides of the longitudinal axis of said fuselage clear of the air stream of the propeller of the craft, each of said appliances including casing open throughout its chord and span, radially disposed stabilizer area within said casing and extending approximately the length thereof, and means for producing a pressure and flow with said combination area.

2. In air craft having a fuselage, a pair of safety appliances respectively disposed parallel to and on opposite sides of the longitudinal axis of said fuselage clear of the air stream of the propeller of the craft, each of said appliances including a casing open throughout its chord and span, radially disposed stabilizer area within said casing and extending approximately the length thereof, means for producing a pressure and flow with said casing, and vertical and horizontal fins extending outwardly from said combination area.

3. In an air craft having a fuselage, a pair of safety appliances respectively disposed on opposite sides of the longitudinal axis of said fuselage, each of said appliances including a casing open throughout its chord and span, radially disposed stabilizer area within said air tunnel and extending approximately the length thereof, means for producing a pressure and flow with said casing, vertical and horizontal fins extending outwardly from said casing, and ailerons at the rear ends of said vertical and horizontal fins.

4. In an air craft having stabilizer devices on opposite sides of the longitudinal axis thereof, each of said devices including a restricted casing open throughout its chord and span stabilizing area within said casing and extending approximately the length thereof, the leading edges of said area tapering from front to rear.

5. In an air craft having stabilizer devices on opposite sides of the longitudinal axis thereof, each of said devices including a restricted casing open throughout its chord and span stabilizing area within said casing and extending approximately the length thereof, the leading edges of said area tapering from front to rear, and a horizontally disposed elevator rudder at the rear end of said casing.

6. In an air craft having stabilizer devices on opposite sides of the longitudinal axis thereof, each of said devices including a restricted casing open throughout its chord and span stabilizing area within said casing and extending approximately the length thereof, the leading edges of said area tapering from front to rear, a horizontally disposed elevator rudder at the rear end of said casing, sets of opposed vertical and horizontal fins extending outwardly from said casing, and ailerons at the rear ends of said sets of fins.

7. A safety device for air crafts comprising a restricted casing open throughout its chord and span having a restricted gap/chord ratio adjacent the front and rear end thereof, a vertical stabilizer area depending from the top wall of said casing, and horizontal stabilizer area extending inwardly from opposite sides of the same, all of the stabilizer area tapering from the rear end toward the front end.

8. A safety device for air crafts comprising a restricted casing open throughout its chord and span having a restricted gap/chord ratio adjacent the front end thereof, a vertical stabilizer area depending from the top wall of said casing, horizontal stabilizer area extending inwardly from opposite sides of the same, all of said stabilizer area tapering from the rear end toward the front end, the horizontal fins meeting the vertical fins at its rear end.

9. A safety device for air crafts comprising a restricted casing open throughout its chord and span having a restricted gap/chord ratio adjacent the front and rear ends thereof, a vertical stabilizer area depending from the top sections of said casing, horizontal stabilizer area extending inwardly from opposite sides of the same, all of the stabilizer area tapering from the rear end toward the front end, the horizontal fins meeting the vertical area at its rear end, and an elevator rudder mounted at the rear of said casing centrally thereof.

10. A safety device for air crafts and the like comprising a body member, sets of vertical and horizontal fins extending outwardly and radially from said body member, the said fins tapering from the rear end toward the front end.

11. A safety device for air crafts and the like comprising a body member, sets of vertical and horizontal fins extending outwardly and radially from said body member, the said fins tapering from the rear end toward the front end, and ailerons mounted at the rear ends of said sets of fins.

12. A safety device of the class described comprising a restricted casing open throughout its chord and span, a vertical stabilizer depending from the top section of said casing, and horizontal area extending inwardly from opposite sides of the same, all of said stabilizer fins tapering from the rear end toward the front end.

13. A safety device comprising restricted casing of square shape in cross section and disposed with their opposite corners in vertical and horizontal alinement, and fins extending outwardly from the corners of said casing.

In testimony whereof we affix our signatures.

PAUL SMITH.
FRED H. MANN.